(12) United States Patent
Chang et al.

(10) Patent No.: US 8,863,212 B2
(45) Date of Patent: Oct. 14, 2014

(54) PRESENTATION OF AN ADAPTIVE AVATAR

(75) Inventors: E-Lee Chang, Mableton, GA (US); Horst Schroeter, New Providence, NJ (US); Linda Roberts, Decatur, GA (US); Darnell Clayton, Atlanta, GA (US); Madhur Khandelwal, Atlanta, GA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 1108 days.

(21) Appl. No.: 12/253,115

(22) Filed: Oct. 16, 2008

(65) Prior Publication Data
US 2010/0100907 A1 Apr. 22, 2010

(51) Int. Cl.
*H04N 7/173* (2011.01)
*G06F 3/00* (2006.01)
*G06F 17/28* (2006.01)
*G06F 3/048* (2013.01)
*H04N 21/81* (2011.01)
*H04N 21/472* (2011.01)
*H04N 21/233* (2011.01)
*H04N 21/475* (2011.01)
*G06F 3/01* (2006.01)
*H04N 5/45* (2011.01)
*H04N 21/431* (2011.01)
*H04N 21/258* (2011.01)

(52) U.S. Cl.
CPC .......... *G06F 17/289* (2013.01); *H04N 21/8146* (2013.01); *H04N 21/47202* (2013.01); *H04N 21/47205* (2013.01); *H04N 21/233* (2013.01); *H04N 21/4753* (2013.01); *G06F 3/01* (2013.01); *H04N 21/472* (2013.01); *H04N 5/45* (2013.01); *H04N 21/4312* (2013.01); *H04N 21/25891* (2013.01); *H04N 21/4314* (2013.01)
USPC .................. 725/110; 704/2; 725/46; 715/706

(58) Field of Classification Search
USPC .......................................... 725/37
See application file for complete search history.

(56) References Cited

U.S. PATENT DOCUMENTS

2001/0034661 A1* 10/2001 Ferreira ........................ 705/26
2004/0128350 A1* 7/2004 Topfl et al. .................... 709/204

(Continued)

OTHER PUBLICATIONS

Youtube, "Apple Futureshock, Knowledge Navigator", 2 pages, http://www.youtube.com/watch?v=3WdS4Tscwh8, web site last visited Sep. 18, 2008.

(Continued)

*Primary Examiner* — John Schnurr
*Assistant Examiner* — Christine Kurien
(74) *Attorney, Agent, or Firm* — Guntin & Gust, PLC; Andrew Gust

(57) ABSTRACT

A system that incorporates teachings of the present disclosure may include, for example, an avatar engine having a controller to retrieve a user profile of a user, present the user an avatar having characteristics that correlate to the user profile, detect one or more responses of the user during a communication exchange between the avatar and the user, establish a communication session with a language translation system responsive to identifying from the one or more responses a need to engage in language translations, transmit to the language translation system content in a language format other than a language understood by the user, receive from the language translation system a translation of the content in the language understood by the user, and present the user an adaptation of the avatar that presents the translated content in the user's language. Other embodiments are disclosed.

25 Claims, 9 Drawing Sheets

(56) References Cited

U.S. PATENT DOCUMENTS

| | | |
|---|---|---|
| 2005/0223328 A1 | 10/2005 | Ashtekar et al. |
| 2007/0074114 A1 | 3/2007 | Adjali et al. |
| 2009/0027337 A1* | 1/2009 | Hildreth .................. 345/158 |
| 2009/0158170 A1* | 6/2009 | Narayanan et al. ........... 715/753 |
| 2009/0210213 A1* | 8/2009 | Cannon et al. .................... 704/2 |
| 2009/0217320 A1* | 8/2009 | Aldrey ........................... 725/37 |

OTHER PUBLICATIONS

Cosatto et al., "Lifelike Talking Faces for Interactive Service", pp. 1406-1429, Proceedings of the IEEE, vol. 91, No. 9, Sep. 2003.

Cosatto et al., "From Audio-Only to Audio and Video Text-to-Speech", pp. 1084-1095, Acta Acustica United with Acustica, vol. 90, Accepted Apr. 14, 2004.

* cited by examiner

200

500

600

700

US 8,863,212 B2

PRESENTATION OF AN ADAPTIVE AVATAR

FIELD OF THE DISCLOSURE

The present disclosure relates generally to avatar presentation techniques and more specifically to a presentation of an avatar in a media communication system.

BACKGROUND

Developments in speech synthesis and computer animation enable the real-time synthesis of faces that look and sound like actual people. With recent advances in speech recognition, natural language interpretation and speech synthesis, conversational interfaces are finding wider acceptance. Collectively, these technologies can be used to produce human-like or animated interactive avatars.

DETAILED DESCRIPTION

One embodiment of the present disclosure can entail an Internet Protocol Television (IPTV) system having a controller to retrieve a user profile associated with a user of the IPTV system, cause a set-top box (STB) operating in the IPTV system to present the user an avatar having characteristics that correlate to the user profile, receive from the STB one or more responses of the user, wherein the one or more responses are collected by the STB from a communication exchange between the avatar and the user, identify from the one or more responses a need to engage in language translations, establish a communication session with a language translation system, adapt the characteristics of the avatar at least in part according to instructions supplied by the language translation system, transmit to the language translation system content in a language format other than a language understood by the user, receive from the language translation system a translation of the content in the language understood by the user, and cause the STB to present the user the adapted avatar presenting the translated content in the user's language.

Another embodiment of the present disclosure can entail an avatar engine having a controller to retrieve a user profile of a user, present the user an avatar having characteristics that correlate to the user profile, detect one or more responses of the user during a communication exchange between the avatar and the user, establish a communication session with a language translation system responsive to identifying from the one or more responses a need to engage in language translations, transmit to the language translation system content in a language format other than a language understood by the user, receive from the language translation system a translation of the content in the language understood by the user, and present the user an adaptation of the avatar that presents the translated content in the user's language.

Yet another embodiment of the present disclosure can entail an avatar engine having a controller retrieve a user profile of a user, present the user an avatar having characteristics that correlate to the user profile, detect one or more responses of the user during a communication exchange between the avatar and the user, identify from the one or more responses a desire to tour a location, establish a communication session with a tour guide system, adapt the characteristics of the avatar at least in part according to instructions supplied by the tour guide system, and present the user the adapted avatar presenting the tour of the location.

Figure 1:
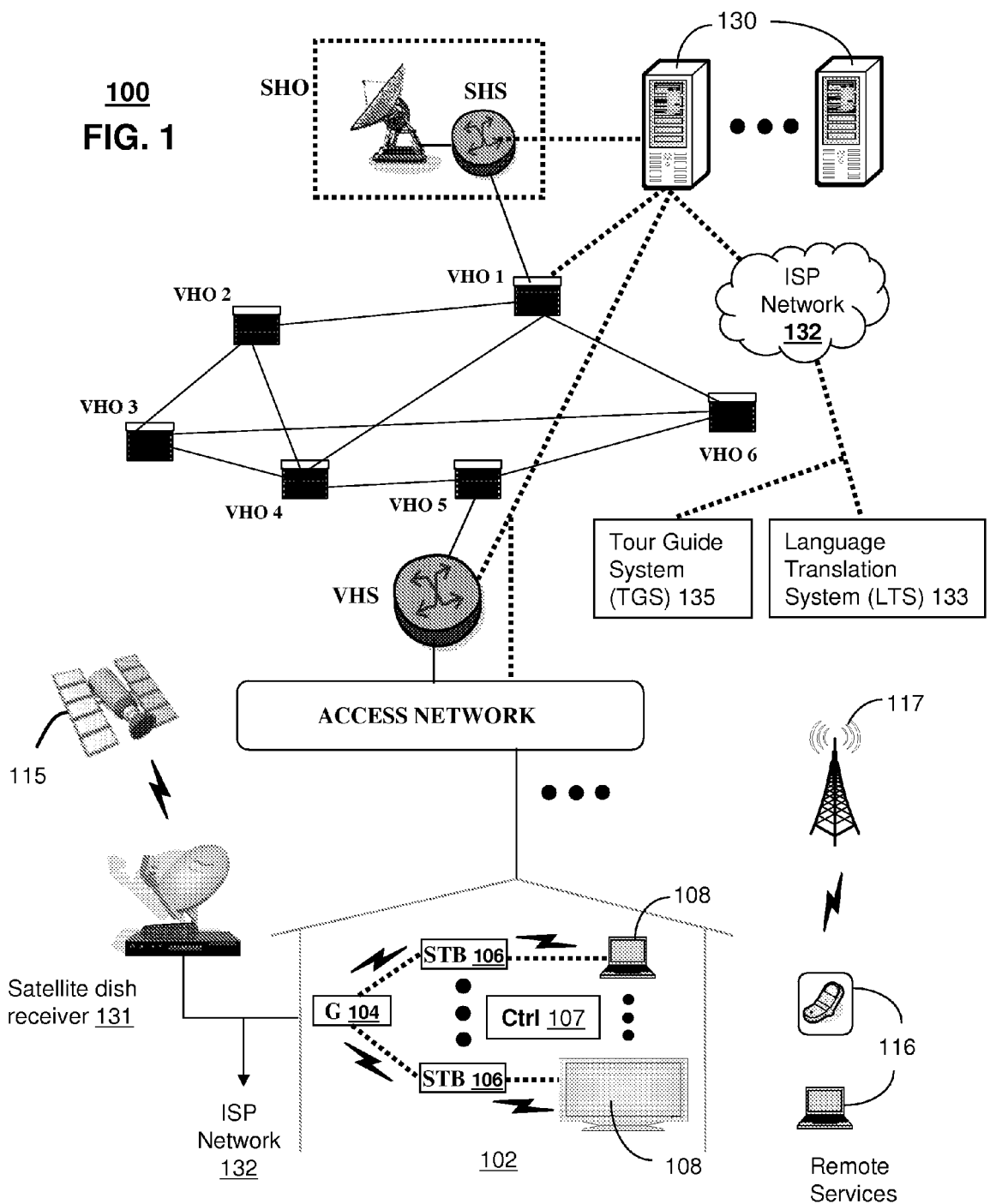
FIGS. 1-4 depict illustrative embodiments of communication systems that provide media services.

FIG. 1 depicts an illustrative embodiment of a first communication system 100 for delivering media content. The communication system 100 can represent an Internet Protocol Television (IPTV) broadcast media system. In a typical IPTV infrastructure, there is a super head-end office (SHO) with at least one super headend office server (SHS) which receives national media programs from satellite and/or media servers from service providers of multimedia broadcast channels. In the present context, media programs can represent audio content, moving image content such as videos, still image content, and/or combinations thereof. The SHS server forwards IP packets associated with the media content to video head-end servers (VHS) via a network of aggregation points such as video head-end offices (VHO) according to a common multicast communication method.

The VHS then distributes multimedia broadcast programs via an access network to commercial and/or residential buildings 102 housing a gateway 104 (such as a residential gateway or RG). The access network can represent a bank of digital subscriber line access multiplexers (DSLAMs) located in a central office or a service area interface that provide broadband services over optical links or copper twisted pairs to buildings 102. The gateway 104 distributes broadcast signals to media processors 106 such as Set-Top Boxes (STBs) which in turn present broadcast selections to media devices 108 such as computers or television sets managed in some instances by a media controller 107 (such as an infrared or RF remote control). Unicast traffic can also be exchanged between the media processors 106 and subsystems of the IPTV media system for services such as video-on-demand (VoD). It will be appreciated by one of ordinary skill in the art that the media devices 108 and/or portable communication devices 116 shown in FIG. 1 can be an integral part of the media processor 106 and can be communicatively coupled to the gateway 104. In this particular embodiment, an integral device such as described can receive, respond, process and present multicast or unicast media content.

The IPTV media system can be coupled to one or more computing devices 130 a portion of which can operate as a web server for providing portal services over an Internet Service Provider (ISP) network 132 to fixed line media devices 108 or portable communication devices 116 by way of a wireless access point 117 providing Wireless Fidelity or WiFi services, or cellular communication services (such as GSM, CDMA, UMTS, WiMAX, etc.).

Another distinct portion of the one or more computing devices 130 can be used as an avatar engine (herein referred to as an avatar engine 130) for generating and managing interactive avatars which users of the first communication system 100 can be presented for general assistance and presentation of interactive television (iTV) services as well as other services described below. The avatar engine 130 can use common imaging technologies for creating avatars with human-like or animated qualities. The avatar engine 130 can also use common speech recognition and speech synthesis technologies to produce an interactive avatar.

From a determination of a context of an exchange between a user and an avatar presented by the avatar engine 130 by way of for example an STB or some other communication device (such as a computer, a cellular phone, etc.), the avatar engine can identify a need to communicate with a language translation system (LTS) 133 and/or a tour guide system (TGS) 135 by way of the ISP network 132 (or another common communication means). The LTS 133 can use common technology to translate audible speech and/or readable text to other languages. To accomplish this, the LTS 133 can use, for example, common speech and text recognition technology to interpret words, and phrases. The LTS 133 can also utilize common technology (databases, synthesis tools, and so on) to translate words, phrases, and idioms to other languages.

The TGS 135 can provide the user a tour of popular tourist sites, cities, and so on. If the tour is a live tour (e.g., the user carrying a cellular phone operating the avatar engine 130 in the vicinity of the location to be toured), the TGS 135 can utilize a common location services system to provide navigation instructions to the user based on location coordinates retrieved from the communication device of the user (such as GPS coordinates supplied by a GPS receiver in the communication device of the user). The TGS 135 can access common tour guide resources (such as databases of sites commonly visited) to provide the user a basic or comprehensive tour of a requested location.

The LTS 133 and TGS 135 can singly or cooperatively provide the avatar engine 130 instructions (such as artificial intelligence instructions or software) to adapt characteristics of an avatar generated by the avatar engine. Alternatively, the avatar engine 130 can share control of the presentation of the avatar with the LTS 133 and/or the TGS 135 singly or in combination.

A satellite broadcast television system can be used in place of the IPTV media system. In this embodiment, signals transmitted by a satellite 115 can be intercepted by a satellite dish receiver 131 coupled to building 102 which conveys media signals to the media processors 106. The media receivers 106 can be equipped with a broadband port to the ISP network 132. Although not shown, the communication system 100 can also be combined or replaced with analog or digital broadcast distributions systems such as cable TV systems.

Figure 2:
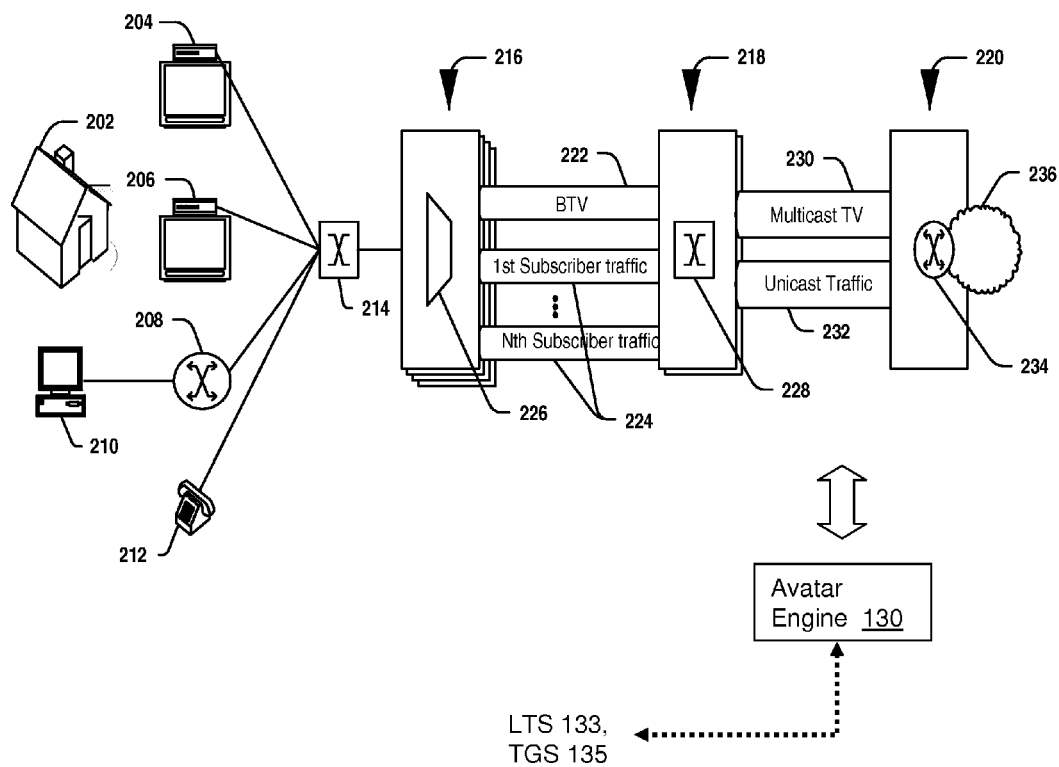

FIG. 2 depicts an illustrative embodiment of a second communication system 200 for delivering media content. Communication system 200 can be overlaid or operably coupled with communication system 100 as another representative embodiment of said communication system. The system 200 includes a distribution switch/router system 228 at a central office 218. The distribution switch/router system 228 receives video data via a multicast television stream 230 from a second distribution switch/router 234 at an intermediate office 220. The multicast television stream 230 includes Internet Protocol (IP) data packets addressed to a multicast IP address associated with a television channel. The distribution switch/router system 228 can cache data associated with each television channel received from the intermediate office 220.

The distribution switch/router system 228 also receives unicast data traffic from the intermediate office 220 via a unicast traffic stream 232. The unicast traffic stream 232 includes data packets related to devices located at a particular residence, such as the residence 202. For example, the unicast traffic stream 232 can include data traffic related to a digital subscriber line, a telephone line, another data connection, or any combination thereof. To illustrate, the unicast traffic stream 232 can communicate data packets to and from a telephone 212 associated with a subscriber at the residence 202. The telephone 212 can be a Voice over Internet Protocol (VoIP) telephone. To further illustrate, the unicast traffic stream 232 can communicate data packets to and from a personal computer 210 at the residence 202 via one or more data routers 208. In an additional illustration, the unicast traffic stream 232 can communicate data packets to and from a set-top box device, such as the set-top box devices 204, 206. The unicast traffic stream 232 can communicate data packets to and from the devices located at the residence 202 via one or more residential gateways 214 associated with the residence 202.

The distribution switch/router system 228 can send data to one or more access switch/router systems 226. The access switch/router system 226 can include or be included within a service area interface 216. In a particular embodiment, the access switch/router system 226 can include a DSLAM. The access switch/router system 226 can receive data from the distribution switch/router system 228 via a broadcast television (BTV) stream 222 and a plurality of unicast subscriber traffic streams 224. The BTV stream 222 can be used to communicate video data packets associated with a multicast stream.

For example, the BTV stream 222 can include a multicast virtual local area network (VLAN) connection between the distribution switch/router system 228 and the access switch/router system 226. Each of the plurality of subscriber traffic streams 224 can be used to communicate subscriber specific data packets. For example, the first subscriber traffic stream can communicate data related to a first subscriber, and the nth subscriber traffic stream can communicate data related to an nth subscriber. Each subscriber to the system 200 can be associated with a respective subscriber traffic stream 224. The subscriber traffic stream 224 can include a subscriber VLAN connection between the distribution switch/router system 228 and the access switch/router system 226 that is associated with a particular set-top box device 204, 206, a particular residence 202, a particular residential gateway 214, another device associated with a subscriber, or any combination thereof.

In an illustrative embodiment, a set-top box device, such as the set-top box device 204, receives a channel change command from an input device, such as a remoter control device. The channel change command can indicate selection of an IPTV channel. After receiving the channel change command, the set-top box device 204 generates channel selection data that indicates the selection of the IPTV channel. The set-top box device 204 can send the channel selection data to the access switch/router system 226 via the residential gateway 214. The channel selection data can include an Internet Group Management Protocol (IGMP) Join request. In an illustrative embodiment, the access switch/router system 226 can identify whether it is joined to a multicast group associated with the requested channel based on information in the IGMP Join request.

If the access switch/router system 226 is not joined to the multicast group associated with the requested channel, the access switch/router system 226 can generate a multicast stream request. The multicast stream request can be generated by modifying the received channel selection data. In an illustrative embodiment, the access switch/router system 226 can modify an IGMP Join request to produce a proxy IGMP Join request. The access switch/router system 226 can send the multicast stream request to the distribution switch/router system 228 via the BTV stream 222. In response to receiving the multicast stream request, the distribution switch/router system 228 can send a stream associated with the requested channel to the access switch/router system 226 via the BTV stream 222.

The avatar engine 130 of FIG. 1 can be operably coupled to the second communication system 200 for purposes similar to those described above.

Figure 3:
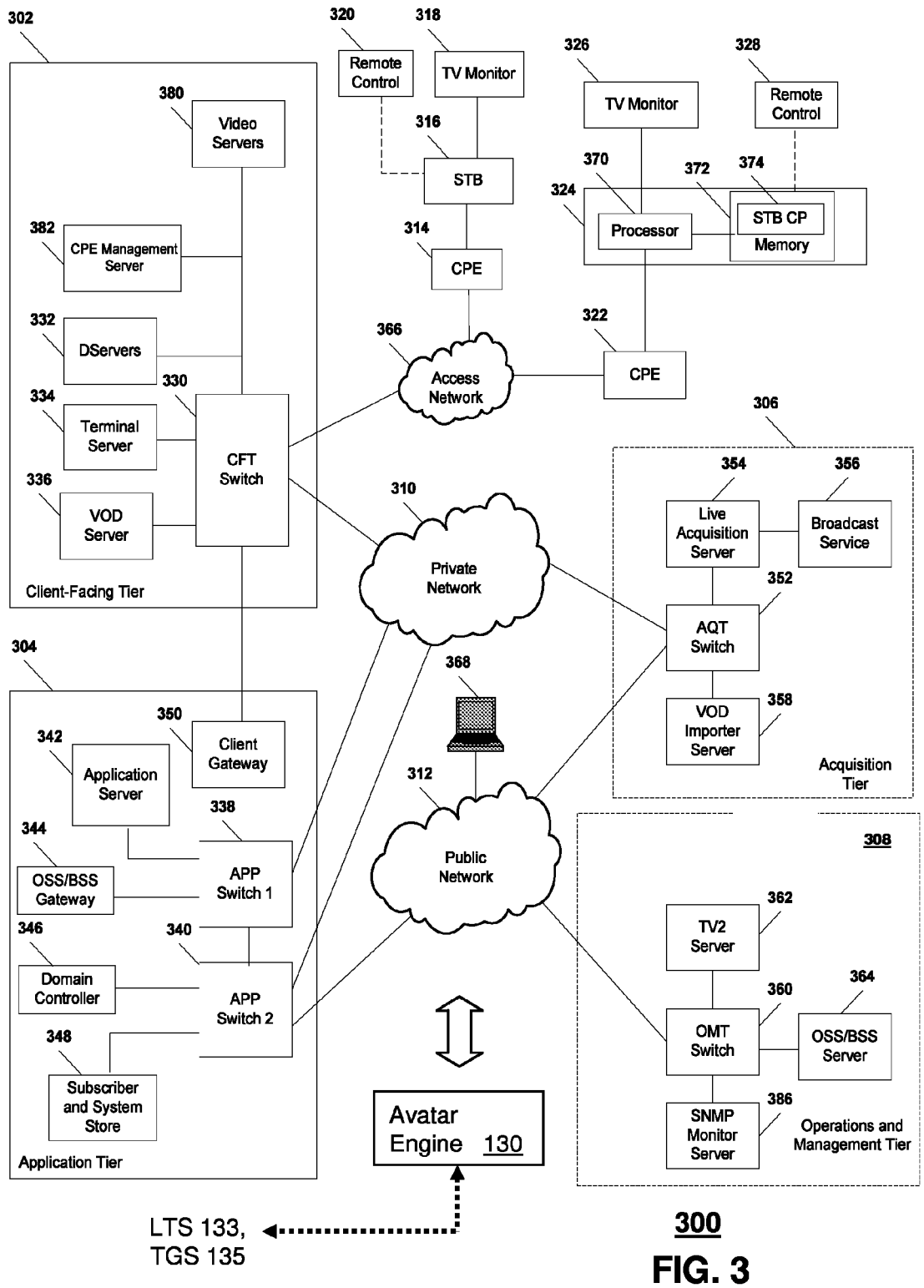

FIG. 3 depicts an illustrative embodiment of a third communication system 300 for delivering media content. Communication system 300 can be overlaid or operably coupled with communication systems 100-200 as another representative embodiment of said communication systems. As shown, the system 300 can include a client facing tier 302, an application tier 304, an acquisition tier 306, and an operations and management tier 308. Each tier 302, 304, 306, 308 is coupled to a private network 310, such as a network of common packet-switched routers and/or switches; to a public network 312, such as the Internet; or to both the private network 310 and the public network 312. For example, the client-facing tier 302 can be coupled to the private network 310. Further, the application tier 304 can be coupled to the private network 310 and to the public network 312. The acquisition tier 306 can also be coupled to the private network 310 and to the public network 312. Additionally, the operations and management tier 308 can be coupled to the public network 312.

As illustrated in FIG. 3, the various tiers 302, 304, 306, 308 communicate with each other via the private network 310 and the public network 312. For instance, the client-facing tier 302 can communicate with the application tier 304 and the acquisition tier 306 via the private network 310. The application tier 304 can communicate with the acquisition tier 306 via the private network 310. Further, the application tier 304 can communicate with the acquisition tier 306 and the operations and management tier 308 via the public network 312. Moreover, the acquisition tier 306 can communicate with the operations and management tier 308 via the public network 312. In a particular embodiment, elements of the application tier 304, including, but not limited to, a client gateway 350, can communicate directly with the client-facing tier 302.

The client-facing tier 302 can communicate with user equipment via an access network 366, such as an IPTV access network. In an illustrative embodiment, customer premises equipment (CPE) 314, 322 can be coupled to a local switch, router, or other device of the access network 366. The client-facing tier 302 can communicate with a first representative set-top box device 316 via the first CPE 314 and with a second representative set-top box device 324 via the second CPE 322. In a particular embodiment, the first representative set-top box device 316 and the first CPE 314 can be located at a first customer premise, and the second representative set-top box device 324 and the second CPE 322 can be located at a second customer premise.

In another particular embodiment, the first representative set-top box device 316 and the second representative set-top box device 324 can be located at a single customer premise, both coupled to one of the CPE 314, 322. The CPE 314, 322 can include routers, local area network devices, modems, such as digital subscriber line (DSL) modems, any other suitable devices for facilitating communication between a set-top box device and the access network 366, or any combination thereof.

In an illustrative embodiment, the client-facing tier 302 can be coupled to the CPE 314, 322 via fiber optic cables. In another illustrative embodiment, the CPE 314, 322 can include DSL modems that are coupled to one or more network nodes via twisted pairs, and the client-facing tier 302 can be coupled to the network nodes via fiber-optic cables. Each set-top box device 316, 324 can process data received via the access network 366, via a common IPTV software platform.

The first set-top box device 316 can be coupled to a first external display device, such as a first television monitor 318, and the second set-top box device 324 can be coupled to a second external display device, such as a second television monitor 326. Moreover, the first set-top box device 316 can communicate with a first remote control 320, and the second set-top box device 324 can communicate with a second remote control 328. The set-top box devices 316, 324 can include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an illustrative, non-limiting embodiment, each set-top box device 316, 324 can receive data, video, or any combination thereof, from the client-facing tier 302 via the access network 366 and render or display the data, video, or any combination thereof, at the display device 318, 326 to which it is coupled. In an illustrative embodiment, the set-top box devices 316, 324 can include tuners that receive and decode television programming signals or packet streams for transmission to the display devices 318, 326. Further, the set-top box devices 316, 324 can each include a STB processor 370 and a STB memory device 372 that is accessible to the STB processor 370. In one embodiment, a computer program, such as the STB computer program 374, can be embedded within the STB memory device 372.

In an illustrative embodiment, the client-facing tier 302 can include a client-facing tier (CFT) switch 330 that manages communication between the client-facing tier 302 and the access network 366 and between the client-facing tier 302 and the private network 310. As illustrated, the CFT switch 330 is coupled to one or more distribution servers, such as Distribution-servers (D-servers) 332, that store, format, encode, replicate, or otherwise manipulate or prepare video content for communication from the client-facing tier 302 to the set-top box devices 316, 324. The CFT switch 330 can also be coupled to a terminal server 334 that provides terminal devices with a point of connection to the IPTV system 300 via the client-facing tier 302.

In a particular embodiment, the CFT switch 330 can be coupled to a VoD server 336 that stores or provides VoD content imported by the IPTV system 300. Further, the CFT switch 330 is coupled to one or more video servers 380 that receive video content and transmit the content to the set-top boxes 316, 324 via the access network 366. The client-facing tier 302 may include a CPE management server 382 that manages communications to and from the CPE 314 and the CPE 322. For example, the CPE management server 382 may collect performance data associated with the set-top box devices 316, 324 from the CPE 314 or the CPE 322 and forward the collected performance data to a server associated with the operations and management tier 308.

In an illustrative embodiment, the client-facing tier 302 can communicate with a large number of set-top boxes, such as the representative set-top boxes 316, 324, over a wide geographic area, such as a metropolitan area, a viewing area, a statewide area, a regional area, a nationwide area or any other suitable geographic area, market area, or subscriber or customer group that can be supported by networking the client-facing tier 302 to numerous set-top box devices. In a particular embodiment, the CFT switch 330, or any portion thereof, can include a multicast router or switch that communicates with multiple set-top box devices via a multicast-enabled network.

As illustrated in FIG. 3, the application tier 304 can communicate with both the private network 310 and the public network 312. The application tier 304 can include a first application tier (APP) switch 338 and a second APP switch 340. In a particular embodiment, the first APP switch 338 can be coupled to the second APP switch 340. The first APP switch 338 can be coupled to an application server 342 and to an OSS/BSS gateway 344. In a particular embodiment, the application server 342 can provide applications to the set-top box devices 316, 324 via the access network 366, which enable the set-top box devices 316, 324 to provide functions, such as interactive program guides, video gaming, display, messaging, processing of VoD material and other IPTV content, etc. In an illustrative embodiment, the application server 342 can provide location information to the set-top box devices 316, 324. In a particular embodiment, the OSS/BSS gateway 344 includes operation systems and support (OSS) data, as well as billing systems and support (BSS) data. In one embodiment, the OSS/BSS gateway 344 can provide or restrict access to an OSS/BSS server 364 that stores operations and billing systems data.

The second APP switch 340 can be coupled to a domain controller 346 that provides Internet access, for example, to users at their computers 368 via the public network 312. For example, the domain controller 346 can provide remote Internet access to IPTV account information, e-mail, personalized Internet services, or other online services via the public network 312. In addition, the second APP switch 340 can be coupled to a subscriber and system store 348 that includes account information, such as account information that is associated with users who access the IPTV system 300 via the private network 310 or the public network 312. In an illustrative embodiment, the subscriber and system store 348 can store subscriber or customer data and create subscriber or customer profiles that are associated with IP addresses, stock-keeping unit (SKU) numbers, other identifiers, or any combination thereof, of corresponding set-top box devices 316, 324. In another illustrative embodiment, the subscriber and system store can store data associated with capabilities of set-top box devices associated with particular customers.

In a particular embodiment, the application tier 304 can include a client gateway 350 that communicates data directly to the client-facing tier 302. In this embodiment, the client gateway 350 can be coupled directly to the CFT switch 330. The client gateway 350 can provide user access to the private network 310 and the tiers coupled thereto. In an illustrative embodiment, the set-top box devices 316, 324 can access the IPTV system 300 via the access network 366, using information received from the client gateway 350. User devices can access the client gateway 350 via the access network 366, and the client gateway 350 can allow such devices to access the private network 310 once the devices are authenticated or verified. Similarly, the client gateway 350 can prevent unauthorized devices, such as hacker computers or stolen set-top box devices from accessing the private network 310, by denying access to these devices beyond the access network 366.

For example, when the first representative set-top box device 316 accesses the client-facing tier 302 via the access network 366, the client gateway 350 can verify subscriber information by communicating with the subscriber and system store 348 via the private network 310. Further, the client gateway 350 can verify billing information and status by communicating with the OSS/BSS gateway 344 via the private network 310. In one embodiment, the OSS/BSS gateway 344 can transmit a query via the public network 312 to the OSS/BSS server 364. After the client gateway 350 confirms subscriber and/or billing information, the client gateway 350 can allow the set-top box device 316 to access IPTV content and VoD content at the client-facing tier 302. If the client gateway 350 cannot verify subscriber information for the set-top box device 316, because it is connected to an unauthorized twisted pair, the client gateway 350 can block transmissions to and from the set-top box device 316 beyond the access network 366.

As indicated in FIG. 3, the acquisition tier 306 includes an acquisition tier (AQT) switch 352 that communicates with the private network 310. The AQT switch 352 can also communicate with the operations and management tier 308 via the public network 312. In a particular embodiment, the AQT switch 352 can be coupled to one or more live Acquisition-servers (A-servers) 354 that receive or acquire television content, movie content, advertisement content, other video content, or any combination thereof, from a broadcast service 356, such as a satellite acquisition system or satellite head-end office. In a particular embodiment, the live acquisition server 354 can transmit content to the AQT switch 352, and the AQT switch 352 can transmit the content to the CFT switch 330 via the private network 310.

In an illustrative embodiment, content can be transmitted to the D-servers 332, where it can be encoded, formatted, stored, replicated, or otherwise manipulated and prepared for communication from the video server(s) 380 to the set-top box devices 316, 324. The CFT switch 330 can receive content from the video server(s) 380 and communicate the content to the CPE 314, 322 via the access network 366. The set-top box devices 316, 324 can receive the content via the CPE 314, 322, and can transmit the content to the television monitors 318, 326. In an illustrative embodiment, video or audio portions of the content can be streamed to the set-top box devices 316, 324.

Further, the AQT switch 352 can be coupled to a video-on-demand importer server 358 that receives and stores television or movie content received at the acquisition tier 306 and communicates the stored content to the VoD server 336 at the client-facing tier 302 via the private network 310. Additionally, at the acquisition tier 306, the VoD importer server 358 can receive content from one or more VoD sources outside the IPTV system 300, such as movie studios and programmers of non-live content. The VoD importer server 358 can transmit the VoD content to the AQT switch 352, and the AQT switch 352, in turn, can communicate the material to the CFT switch 330 via the private network 310. The VoD content can be stored at one or more servers, such as the VoD server 336.

When users issue requests for VoD content via the set-top box devices 316, 324, the requests can be transmitted over the access network 366 to the VoD server 336, via the CFT switch 330. Upon receiving such requests, the VoD server 336 can retrieve the requested VoD content and transmit the content to the set-top box devices 316, 324 across the access network 366, via the CFT switch 330. The set-top box devices 316, 324 can transmit the VoD content to the television monitors 318, 326. In an illustrative embodiment, video or audio portions of VoD content can be streamed to the set-top box devices 316, 324.

FIG. 3 further illustrates that the operations and management tier 308 can include an operations and management tier (OMT) switch 360 that conducts communication between the operations and management tier 308 and the public network 312. In the embodiment illustrated by FIG. 3, the OMT switch 360 is coupled to a TV2 server 362. Additionally, the OMT switch 360 can be coupled to an OSS/BSS server 364 and to a simple network management protocol monitor 386 that monitors network devices within or coupled to the IPTV system 300. In a particular embodiment, the OMT switch 360 can communicate with the AQT switch 352 via the public network 312.

The OSS/BSS server 364 may include a cluster of servers, such as one or more CPE data collection servers that are adapted to request and store operations systems data, such as performance data from the set-top box devices 316, 324. In an illustrative embodiment, the CPE data collection servers may be adapted to analyze performance data to identify a condition of a physical component of a network path associated with a set-top box device, to predict a condition of a physical component of a network path associated with a set-top box device, or any combination thereof.

In an illustrative embodiment, the live acquisition server 354 can transmit content to the AQT switch 352, and the AQT switch 352, in turn, can transmit the content to the OMT switch 360 via the public network 312. In this embodiment, the OMT switch 360 can transmit the content to the TV2 server 362 for display to users accessing the user interface at the TV2 server 362. For example, a user can access the TV2 server 362 using a personal computer 368 coupled to the public network 312.

The avatar engine 130 of FIG. 1 can be operably coupled to the third communication system 300 for purposes similar to those described above.

It should be apparent to one of ordinary skill in the art from the foregoing media communication system embodiments that other suitable media communication systems for distributing broadcast media content as well as peer-to-peer exchange of content can be applied to the present disclosure.

Figure 4:
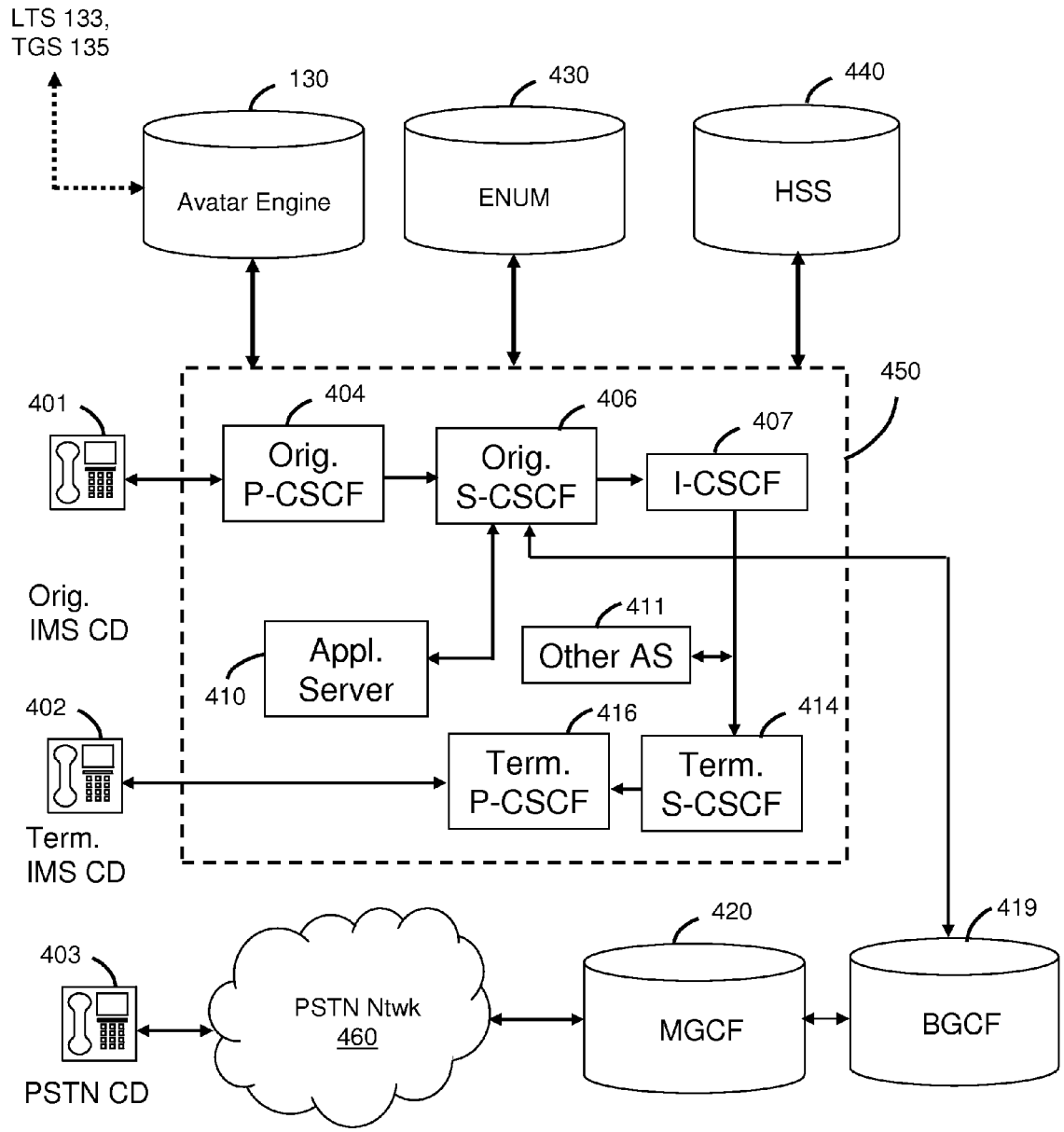

FIG. 4 depicts an illustrative embodiment of a communication system 400 employing an IP Multimedia Subsystem (IMS) network architecture. Communication system 400 can be overlaid or operably coupled with communication systems 100-300 as another representative embodiment of said communication systems.

The communication system 400 can comprise a Home Subscriber Server (HSS) 440, a tElephone NUmber Mapping (ENUM) server 430, and network elements of an IMS network 450. The IMS network 450 can be coupled to IMS compliant communication devices (CD) 401, 402 or a Public Switched Telephone Network (PSTN) CD 403 using a Media Gateway Control Function (MGCF) 420 that connects the call through a common PSTN network 460.

IMS CDs 401, 402 register with the IMS network 450 by contacting a Proxy Call Session Control Function (P-CSCF) which communicates with a corresponding Serving CSCF (S-CSCF) to register the CDs with an Authentication, Authorization and Accounting (AAA) supported by the HSS 440. To accomplish a communication session between CDs, an originating IMS CD 401 can submit a Session Initiation Protocol (SIP INVITE) message to an originating P-CSCF 404 which communicates with a corresponding originating S-CSCF 406. The originating S-CSCF 406 can submit the SIP INVITE message to an application server (AS) such as reference 410 that can provide a variety of services to IMS subscribers. For example, the application server 410 can be used to perform originating treatment functions on the calling party number received by the originating S-CSCF 406 in the SIP INVITE message.

Originating treatment functions can include determining whether the calling party number has international calling services, and/or is requesting special telephony features (such as *72 forward calls, *73 cancel call forwarding, *67 for caller ID blocking, and so on). Additionally, the originating S-CSCF 406 can submit queries to the ENUM system 430 to translate an E. 164 telephone number to a SIP Uniform Resource Identifier (URI) if the targeted communication device is IMS compliant. If the targeted communication device is a PSTN device, the ENUM system 430 will respond with an unsuccessful address resolution and the S-CSCF 406 will forward the call to the MGCF 420 via a Breakout Gateway Control Function (BGCF) 419.

When the ENUM server 430 returns a SIP URI, the SIP URI is used by an Interrogating CSCF (I-CSCF) 407 to submit a query to the HSS 440 to identify a terminating S-CSCF 414 associated with a terminating IMS CD such as reference 402. Once identified, the I-CSCF 407 can submit the SIP INVITE to the terminating S-CSCF 414 which can call on an application server 411 similar to reference 410 to perform the originating treatment telephony functions described earlier. The terminating S-CSCF 414 can then identify a terminating P-CSCF 416 associated with the terminating CD 402. The P-CSCF 416 then signals the CD 402 to establish communications. The aforementioned process is symmetrical. Accordingly, the terms "originating" and "terminating" in FIG. 4 can be interchanged.

IMS network 450 can also be operably coupled to the avatar engine 130 previously discussed for FIG. 1. In this representative embodiment, the avatar engine 130 can be accessed over a PSTN or VoIP channel of communication system 400 by common techniques such as described above.

Figure 5:
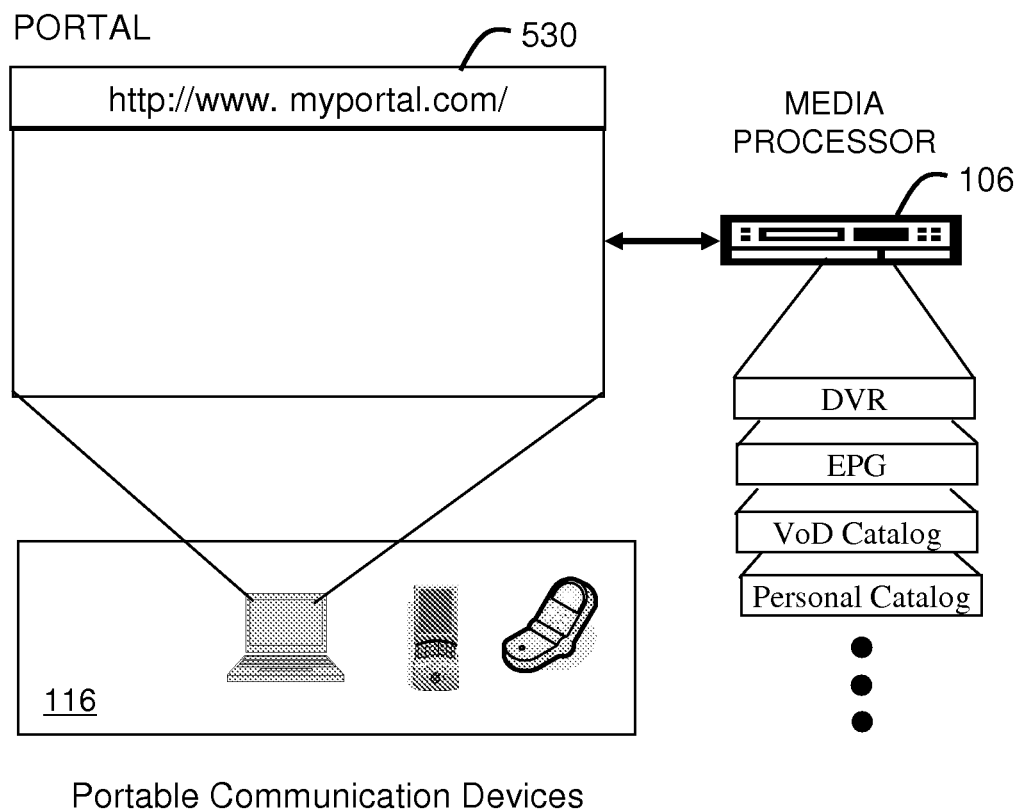
FIG. 5 depicts an illustrative embodiment of a portal interacting with at least one among the communication systems of FIGS. 1-4.

FIG. 5 depicts an illustrative embodiment of a portal 530. The portal 530 can be used for managing services of communication systems 100-400. The portal 530 can be accessed by a Uniform Resource Locator (URL) with a common Internet browser such as Microsoft's Internet Explorer using an Internet-capable communication device such as references 108, 116, or 210 of FIGS. 1-2. The portal 530 can be configured to access a media processor such as references 106, 204, 206, 316, and 324 of FIGS. 1-3 and services managed thereby such as a Digital Video Recorder (DVR), an Electronic Programming Guide (EPG), VoD catalog, a personal catalog (such as personal videos, pictures, audio recordings, etc.) stored in the STB, a personal computer or server in a user's home or office, and so on.

Figure 6:
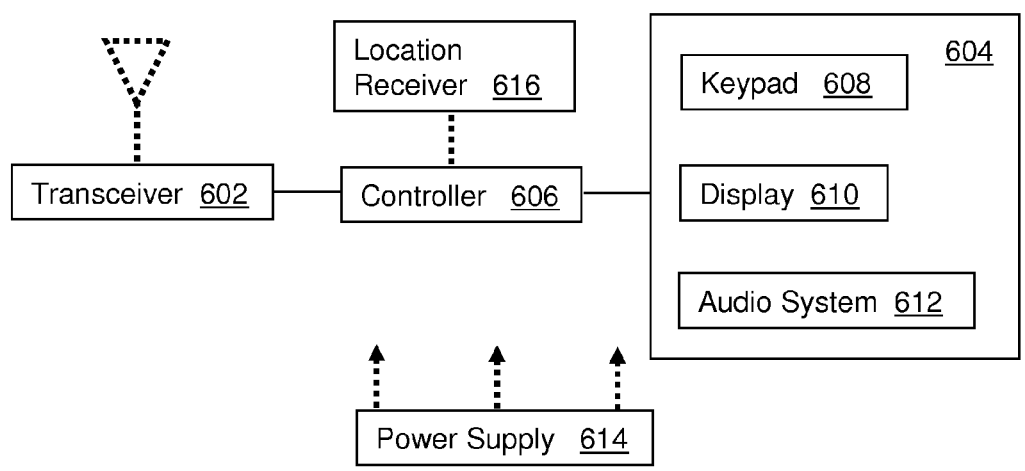
FIG. 6 depicts an illustrative embodiment of a communication device utilized in the communication systems of FIGS. 1-4.

FIG. 6 depicts an exemplary embodiment of a communication device 600. Communication device 600 can be a representative portion of any of the aforementioned communication devices of FIGS. 1-4. The communication device 604 can comprise a wireline and/or wireless transceiver 602 (herein transceiver 602), a user interface (UI) 604, a power supply 614, a location receiver 616, and a controller 606 for managing operations thereof. The transceiver 602 can support short-range or long-range wireless access technologies such as a Bluetooth wireless access protocol, a Wireless Fidelity (WiFi) access protocol, a Digital Enhanced Cordless Telecommunications (DECT) wireless access protocol, cellular, software defined radio (SDR) and/or WiMAX technologies, just to mention a few. Cellular technologies can include, for example, CDMA-1X, UMTS/HSDPA, GSM/GPRS, TDMA/EDGE, EV/DO, and next generation technologies as they arise.

The transceiver 602 can also support common wireline access technologies such as circuit-switched wireline access technologies, packet-switched wireline access technologies, or combinations thereof. PSTN can represent one of the common circuit-switched wireline access technologies. Voice over Internet Protocol (VoIP), and IP data communications can represent some of the commonly available packet-switched wireline access technologies. The transceiver 602 can also be adapted to support IP Multimedia Subsystem (IMS) protocol for interfacing to an IMS network that can combine PSTN and VoIP communication technologies.

The UI 604 can include a depressible or touch-sensitive keypad 608 and a navigation mechanism such as a roller ball, joystick, mouse, and/or navigation disk for manipulating operations of the communication device 600. The keypad 608 can be an integral part of a housing assembly of the communication device 600 or an independent device operably coupled thereto by a tethered wiring interface (such as a USB) or a wireless interface supporting for example Bluetooth. The keypad 608 can represent a numeric dialing keypad commonly used by phones, and/or a Qwerty keypad with alphanumeric keys.

The UI 604 can further include a display 610 such as monochrome or color LCD (Liquid Crystal Display), OLED (Organic Light Emitting Diode) or other suitable display technology for conveying images to the end user of the communication device 600. In an embodiment where the display 610 is touch-sensitive, a portion or all of the keypad 608 can be presented by way of the display. The UI 604 can also include an audio system 612 that utilizes common audio technology for conveying low volume audio (such as audio heard only in the proximity of a human ear) and high volume audio (such as speakerphone for hands free operation). The audio system 612 can further include a microphone for receiving audible signals of an end user.

The power supply 614 can utilize common power management technologies such as replaceable and rechargeable batteries, supply regulation technologies, and charging system technologies for supplying energy to the components of the communication device 600 to facilitate long-range or short-range portable applications. The location receiver 616 utilize common location technology such as a global positioning system (GPS) receiver for identifying a location of the communication device 100, thereby facilitating common location services such as navigation. The controller 606 can utilize computing technologies such as a microprocessor and/or digital signal processor (DSP) with associated storage memory such a Flash, ROM, RAM, SRAM, DRAM or other storage technologies.

Figure 7:
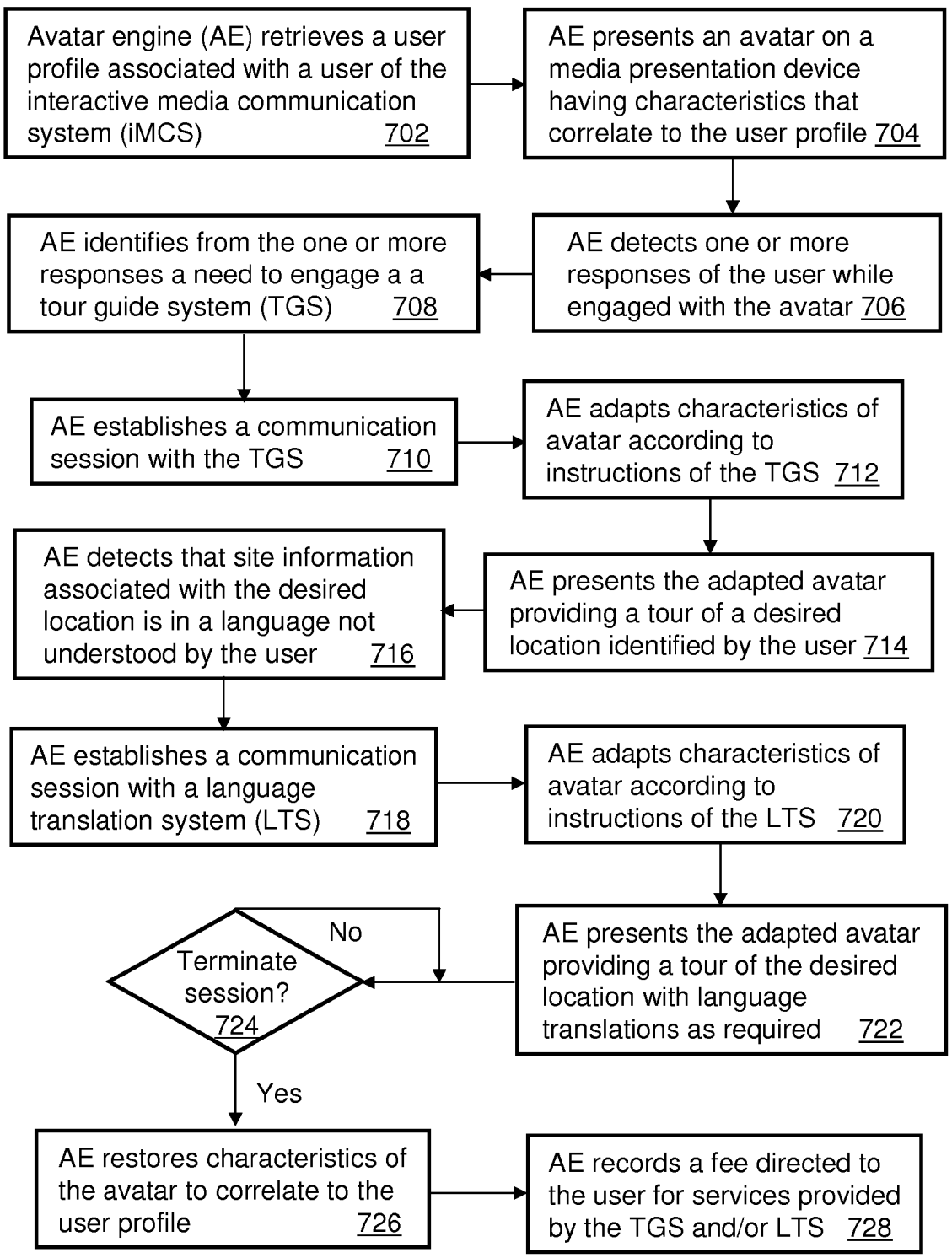
FIG. 7 depicts an illustrative embodiment of a method operating in portions of the communication systems of FIGS. 1-4.
Figure 8:
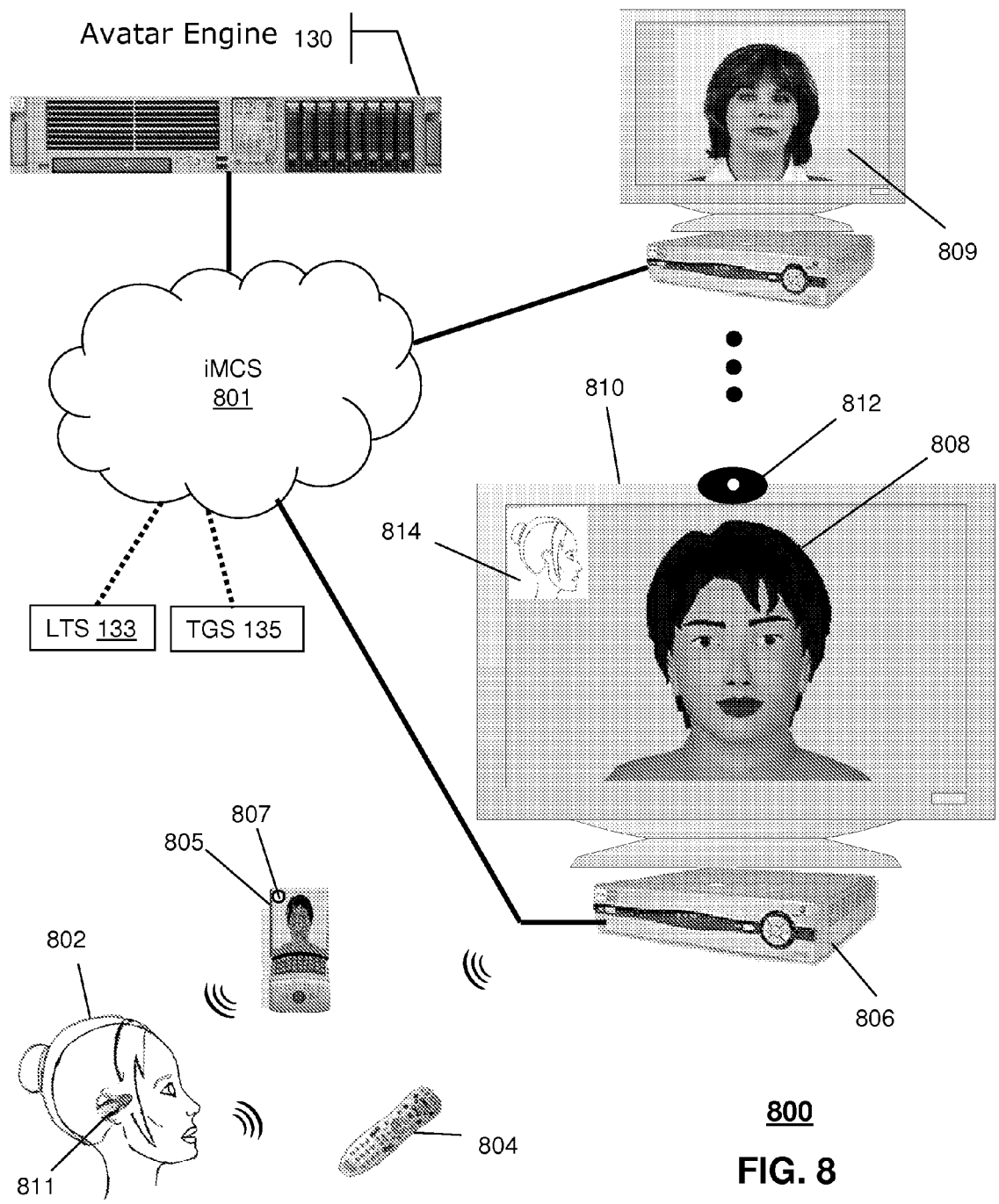
FIG. 8 depicts an illustrative embodiment of a system operating according to the method of FIG. 7.

FIG. 7 depicts an illustrative method 700 operating in portions of communication systems 100-400. FIG. 8 depicts an illustrative embodiment of a system 800 operating according to the method of FIG. 7. FIG. 8 depicts an interactive media communication system 801 such as the systems shown in FIGS. 1-4 (singly or collectively). The interactive media communication system (iMCS) can be coupled to the avatar engine 130 and one or more STBs 806. The STBs 806 are operatively coupled to media presentation devices such as a high-definition television (HDTV) 810 which can present avatar images 808 supplied by the avatar engine 130 by way of the STBs. A user 802 of the STB 806 can interact with the avatar image 808 by speech as well as tactile controls using a remote control 804.

The HDTV 812 can also have a common camera sensor 812 for capturing still and/or moving images of the user 802, which an be displayed in part by the HDTV as a picture-in-picture (PIP) image 814. The visual images of the user can be conveyed to the STB 806. Speech can be detected by a microphone of an audio system of the remote control 804 or an audio system of the STB 806. The avatar image 808 can be an animated image, or can have human-like qualities such as the avatar image 809. The STB 806 can transmit to the avatar engine 130 the visual images as well as speech signals of the user 802 for analysis.

The avatar engine 130 can also be communicatively coupled to a mobile phone 805 with a camera 807 that can convey still or moving images of the user 802 to the avatar engine. The mobile phone 805 can have a audio system for receiving responses of the user 802 and for conveying the user's responsive speech to the avatar engine 130. The audio system can also have a loud speaker to convey to the user 802 synthesized speech of the avatar 808 for hands-free operations. To avoid disturbing others, the mobile phone 805 can also incorporate common Bluetooth wireless transceiver technology to communicate with a common Bluetooth headset 811 worn by the user 802.

With system 800 in mind, method 700 can begin with step 702 in which the avatar engine 130 retrieves a user profile associated with the user 802 of the iMCS 801. This step can be responsive to the user 802 requesting access to the avatar image 808 by initiating a speech command or tactile command (such as selecting an avatar request button on the remote control 804) that is detected by the STB 806, and thereby conveyed to the avatar engine 130. Alternatively, the avatar engine 130 can be communicatively coupled to the mobile phone 805 for presenting the avatar 808 and for facilitating a communication exchange between the user 802 and the avatar which is monitored by the avatar engine.

The user profile can include demographic profiling information of the user 802, psychographic profiling information of the user, and/or user preferences supplied by the user. The demographic profiling information of the user 802 can be based on age, gender, income, number of occupants in household, occupation, education, value of residential property, location of residential property, and/or fees paid for services rendered by the iMCS 801. The demographic profiling information of the user 802 can be determined from a subscriber account of the user and/or monitored media consumption behavior of the user. One or more network elements of the iMCS 801 can utilize common demographic analysis tools to make these determinations.

The psychographic profiling information of the user 802 can also be determined from monitored media consumption behavior of the user and/or subscriber account information. Utilizing common psychographic analysis tools, one or more network elements of the iMCS 801 can generate the psychographic profiling information of the user 802. The psychographic profiling information can identify one or more traits, attitudes, interests, and/or lifestyles of the user 802.

User preferences supplied by the user 802 can identify, for example, a preferred gender for the avatar, a preferred image (could be an image of the user 802, an image of a friend or spouse of the user, celebrity, etc.), a preferred personality for the avatar (mild-mannered avatar), preferred search preferences, preferred content sources, preferred merchants of goods or services, and so on.

In step 704 the avatar engine 130 can present on the HDTV 810 or the mobile phone 805 the avatar image 808 correlated to the user profile as described above. The avatar engine 130 can use common correlation technology to statistically generate an avatar image that is likely suited for the user 802 according to the aforementioned aspects provided by the user profile. Using common speech synthesis and recognition technology, the avatar engine 130 can interact with the user 802 to provide interactive media services. Accordingly, the user 802 can initiate speech or tactile responses on the remote control 804 which can be detected by the avatar engine 130 in step 706 by way of the STB 806. Similarly, the user 802 can initiate speech or tactile responses on a keypad of the mobile phone 805 which can be detected by the avatar engine 130 from signals supplied by the mobile phone.

User responses can represent any detectable visual or audible response of the user 802 monitored by the avatar engine 130 during an exchange between the user and the avatar 808. A response for example can represent a command such as, "Show me my DVR recordings," "Record this program," "Show me the EPG for HD channels," "Show me the VoD catalog for family movies," "Show me YouTube.com", "Show me contemporary music in iTunes™", "What's the weather like outside?", "What's the weather forecast for the next three days?", "Where can I buy Spencer Tracy movies", "Please interpret the following email written in French", "I am meeting with someone who speaks only German, I will need you to serve as a translator", "I've always wanted to visit the Vatacan in Rome, please give me a tour and translate tour sites in Italian", "I have just arrived in Italy, please serve as a translator for me, and guide me to the best restaurants in Florence", and so on.

For illustration purposes, assume the avatar engine 130 identifies in step 708 from the user's response a need to communicate with the TGS 135 of FIG. 8. Further assume that the user 802 is communicating with the avatar engine 130 by way of the mobile phone 805. The need to communicate with the TGS 135 can be determined expressly such as for example when the user states, "I have just arrived in Italy, please provide a tour guide that can direct me to the best restaurants in Rome". In this instance, the avatar engine 130 is expressly instructed to establish communications with the TGS 135. Alternatively, the need to communicate with the TGS 135 can be inferred such as for example when the user states, "I have just arrived in Italy, and I have no idea where to find the best restaurants in Rome, please help me". In this case the avatar engine 130 can infer that the TGS 135 can help the user find restaurants of interest and if desired provide touring information.

Upon establishing communication with the TGS 135 in step 710, the TGS can supply instructions to the avatar engine 130 to adapt presentation aspects of the avatar 808 such as its manner of speaking, its manner of dress, gestures, and other characteristics as directed by the TGS for providing a tour of locations requested by the user. For example, the TGS 135 can direct the avatar engine 130 in step 712 to adapt the dress code of the avatar 808 and present in step 714 a style of dress typical of Italian residents, or a style of dress used by Italian tour guides. The TGS 135 can also direct the avatar engine 135 to change the manner of speaking of the avatar 808 so that it conveys an Italian accent while speaking in the native language of the user. Any number of characteristics of the avatar 808 can be adapted by the TGS 135 to provide an impression of a tour guide suitable for the occasion.

To assist the user 802 in finding restaurants in Rome, the TGS 135 can call on the resources of a location services system (which can be integral to the TGS or communicatively coupled thereto) to provide navigation instructions to a restaurant chosen by the user 802. The location services system can signal the mobile phone 805 by way of the avatar engine 130 to supply location coordinate information to identify the location of the user and to provide step-by-step navigation instructions. Suppose in this illustration that the user 802 has been presented by way of the avatar 808 five options of popular restaurants in Rome summarizing menus in his/her native language, and the user has selected one of the options with a request for directions.

Further suppose that while the avatar engine 130 directs the user 802 to the restaurant by a visual and audible presentation of the avatar 808 as directed by the TGS 135, the TGS detects from its location services system that the user is nearing a vicinity of a popular tourist site. The TGS 135 can direct the avatar engine 130 to inform the user of the upcoming tourist site. Suppose the user 802 indicates s/he wants to explore the site before continuing towards the restaurant. Further assume that the avatar engine 130 is informed by the TGS 135 in step 716 that the site to be explored has a number of plaques and signs that provide useful historical information of the site but is written in Italian, which the user is unable to read. The TGS 135 can make this determination from retrieving site information from a common database that can provide a description of the tourist site. The database can be an integral part of the TGS 135 or a third party database managed by Italian tourist centers which can be accessed by the TGS.

Upon detecting a need to translate a foreign language, the avatar engine 130 can establish in step 718 a communication session with the LTS 133. In this step, the avatar engine 130 can inform the LTS 133 what the language of origin of the content is and the desired language that the content is to be translated into. In another embodiment, the LTS 133 can determine a language of origin from analyzing the content. Alternatively, the TGS 135 can establish communications with the LTS 133 on behalf of the avatar engine 130 and inform it of the tasks needed. The LTS 133 can use common technology to process content in the form of audible speech or text. In the case of audible speech, the LTS 133 can serve as a language interpreter for the user 802, which can be useful for interpreting menus and speaking with an Italian waiter when the user 802 arrives at the restaurant the user selected.

As part of an adaptation of the avatar 808 in step 720, the avatar engine 130 can provide the LTS 133 control of its synthesized speech resources to communicate with the user 802 by presenting a further adaptation of the avatar 808 in step 722 which can be convey by the mobile phone 805. In another embodiment, the LTS 133 can supply the avatar engine 130 the translated content in text, which the avatar engine can then convey as audible synthesized speech by way of the presentation of the avatar 808.

To prevent a complete transformation of the original characteristics of the avatar 808 by the LTS 133 and/or the TGS 135, which might not be desirable to the user 802, the avatar engine 130 can retain some or most of the characteristics originally correlated to the user profile. For example, the avatar engine 130 can retain the facial features of the original avatar image 808. The avatar engine 130 can also prevent a complete change to the voice profile used by the speech synthesis tools of the avatar engine. The avatar engine 130 can also retain a complete record of the behavior patterns of the user 802 such as for example the user's likes and dislikes, an understanding of the user's temper, and general personality.

By retaining some aspects of the avatar image 808 after its adaptation in steps 712 and 720, the avatar engine 130 can minimize the possibility that the user 802 will have a negative reaction to a presentation of the adapted avatar 808. The user preferences in the user profile can be used to define which characteristics of the avatar 808 are to be retained after an adaptation. Alternatively, or in combination, the avatar engine 130 can determine which characteristics are to be retained from behavior modeling of the user 802 from observations of previous tours and language translations, and/or instructions provided by the user (such as for example, "Please do not allow a change to your voice, hair, personality, etc.).

The avatar engine 130 can continue to present the user the adapted avatar 808 generated in step 722 while the user's responses continue to indicate a desire to tour the site mentioned earlier. Once the avatar engine 130 detects that the user 802 is no longer interested in the site (such as, "I think I've seen enough, let's go to the restaurant"), the avatar engine can redirect the user to the restaurant that was previously selected. The TGS 135 can continue to provide the user 802 ideas of other sites to tour while in transit to the restaurant while also providing navigation instructions. Once the user 802 arrives at the restaurant, the LTS 133 can serve as a translator if the waiter does not speak the native language of the user.

In an exchange with the waiter, the mobile phone 805 can transmit to the LTS 133 by way of the avatar engine 130 the waiter's voice, which can be interpreted by the LTS and translated back to the user 802 in his/her language. Similarly, the user 802 can respond to the waiter's translated speech in his/her native language which can be conveyed to the LTS 133 and translated to Italian and thereby presented to the waiter by way of a presentation of the avatar 808. Thus the avatar 808 can serve as a virtual translator for the user 802 and the waiter much the way a real person who speaks Italian and the native language of the user would be able to do in this illustration.

The user 802 can also ask the avatar 808 to translate a menu. The user 802 can for example capture a picture of sections of the menu with the camera 807 of the mobile phone 805 which can be conveyed to the LTS 133 by way of the avatar engine 130. The user can request by a communication exchange with the avatar 808 for a translation of the captured portion of the menu. The LTS 133 can process the image with common optical character recognition (OCR) technology or other suitable image processing technologies to identify the text and thereby translate it to the user's native language. Once the translated menu is presented to the user 802 by way of the avatar 808, the user can inform the avatar what item menus to order. The LTS 133 can then submit an order for these items in Italian which can be conveyed to the speech synthesis resources of the avatar engine 130 which then presents the order to the waiter in Italian by way of the avatar 808.

Once the avatar engine 130 detects in step 724 that the user 802 has no use for the resources of the LTS 133 and TGS 135, such as when the user arrives at the hotel and is going to bed, the avatar engine can terminate the communication session with the LTS 133 and TGS 135 and proceed to step 726 where it restores the characteristics of the avatar 808 to correlate to the user profile. In this step, all characteristics of the avatar correlated to artificial intelligence instructions supplied by the LTS 133 and/or the TGS 135 are effectively terminated. To enhance the user's experience the next day, the avatar engine 130 can record any behavioral patterns detected during the day for subsequent use.

As a revenue source, the avatar engine 130 can be programmed in step 728 to record a fee directed to the service provider of the LTS 133 and/or TGS 135 for providing a means to convey artificial intelligence to the avatar engine 130 that can benefit the marketing and promotion of products or services of the merchant.

Upon reviewing the aforementioned embodiments, it would be evident to an artisan with ordinary skill in the art that said embodiments can be modified, reduced, or enhanced without departing from the scope and spirit of the claims described below. For example, method 700 can be adapted so that it applies to an STB 806 in the premises of the user 802. In this illustrative embodiment, the user 802 can request a virtual tour of the Vatican in Rome, Italy with a translation of site information in Italian. Under these circumstances the avatar engine 130 can invoke the LTS 133 and the TGS 135 in a manner similar to what was described above with the exception that the avatar 808 can be portrayed moving through a three dimensional rendition of the Vatican. This embodiment can be useful for users exploring where they may want to travel next. It can also be useful for users who are unable to travel due to health limitations. Method 700 can also be adapted so it can assist students who are learning history and would like to explore subject areas of study.

It should be further noted that the avatar engine 130 can be integrated in any computing device such as the STB 806, the mobile phone 805, a PDA, a gaming console, a communication device of an IMS system such as shown in FIG. 4, a portal, and so on. Additionally, the avatar engine 130 can be distributed between devices. In this embodiment, a portion of the avatar engine 130 can operate in a network element of the iMCS 801, another portion can operate in the STB, and so on. In addition, the avatar engine 130 can share control of the adaption process of the avatar 808 with multiple systems. The adaptation of characteristics of the avatar 808 (image, speech, gestures, etc.) therefore does not have to be exclusively controlled by the avatar engine 130.

Other suitable modifications can be applied to the present disclosure without departing from the scope of the claims below. Accordingly, the reader is directed to the claims section for a fuller understanding of the breadth and scope of the present disclosure.

Figure 9:
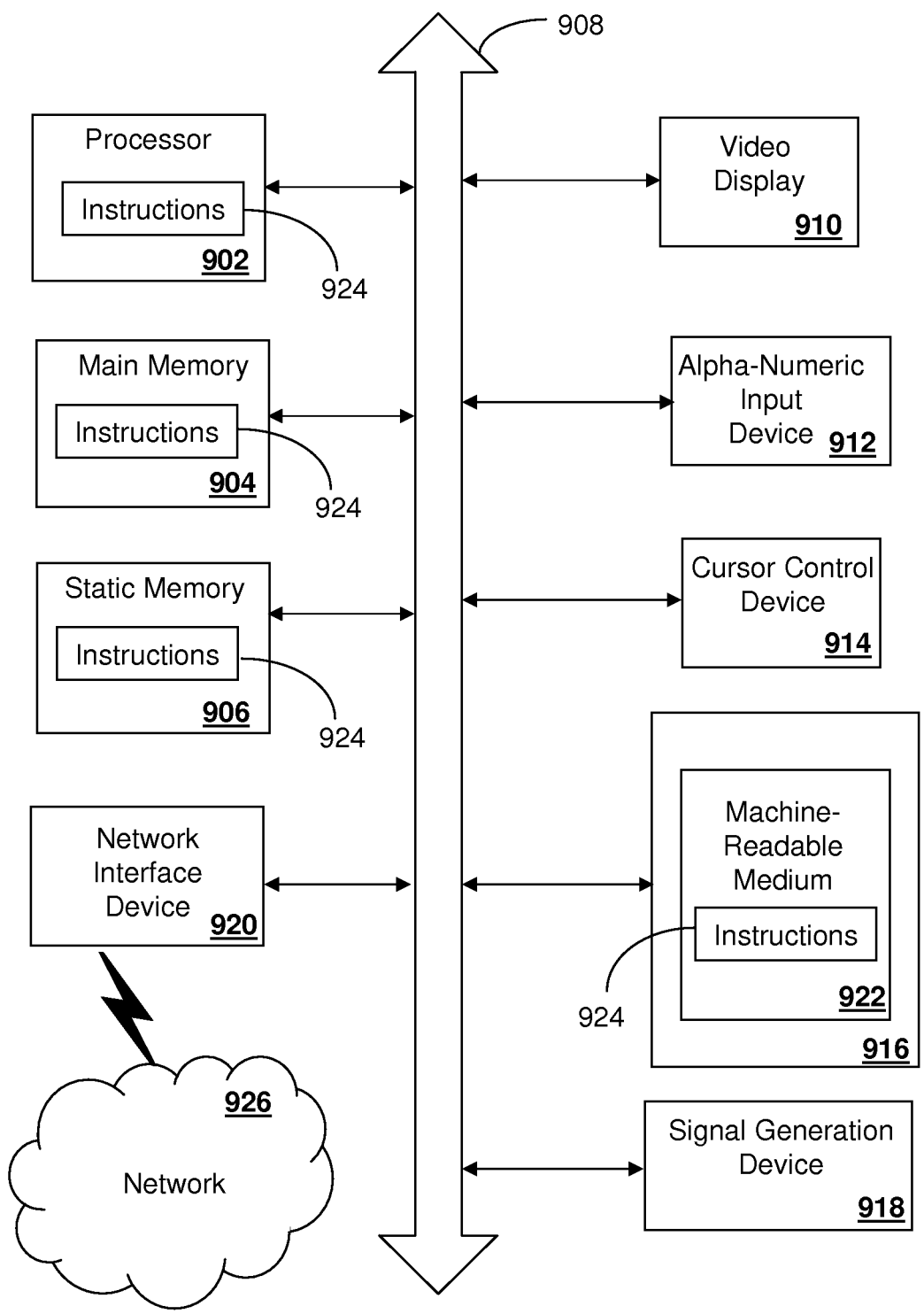
FIG. 9 is a diagrammatic representation of a machine in the form of a computer system within which a set of instructions, when executed, may cause the machine to perform any one or more of the methodologies discussed herein.

FIG. 9 depicts an exemplary diagrammatic representation of a machine in the form of a computer system 900 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 900 may include a processor 902 (e.g., a central processing unit (CPU), a graphics processing unit (GPU), or both), a main memory 904 and a static memory 906, which communicate with each other via a bus 908. The computer system 900 may further include a video display unit 910 (e.g., a liquid crystal display (LCD), a flat panel, a solid state display, or a cathode ray tube (CRT)). The computer system 900 may include an input device 912 (e.g., a keyboard), a cursor control device 914 (e.g., a mouse), a disk drive unit 916, a signal generation device 918 (e.g., a speaker or remote control) and a network interface device 920.

The disk drive unit 916 may include a machine-readable medium 922 on which is stored one or more sets of instructions (e.g., software 924) embodying any one or more of the methodologies or functions described herein, including those methods illustrated above. The instructions 924 may also reside, completely or at least partially, within the main memory 904, the static memory 906, and/or within the processor 902 during execution thereof by the computer system 900. The main memory 904 and the processor 902 also may constitute machine-readable media.

Dedicated hardware implementations including, but not limited to, application specific integrated circuits, programmable logic arrays and other hardware devices can likewise be constructed to implement the methods described herein.

Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 924, or that which receives and executes instructions 924 from a propagated signal so that a device connected to a network environment 926 can send or receive voice, video or data, and to communicate over the network 926 using the instructions 924. The instructions 924 may further be transmitted or received over a network 926 via the network interface device 920.

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An internet protocol television system, comprising:
   a memory storing computer instructions; and
   a controller circuit coupled with the memory, wherein the controller circuit, responsive to executing the computer instructions, performs operations comprising:
      obtaining moving images of a user of a user mobile device;
      analyzing the moving images to detect mine physical gestures of the user, wherein the physical gestures of the user are traits of the user;
      causing a set-top box in communication with the internet protocol television system to present on a display an avatar having characteristics that correlate to the moving images, wherein physical gestures of the avatar correlate with the determined physical gestures of the user;
      receiving from the set-top box one or more responses associated with the user, wherein the one or more responses are generated by the set-top box based on a communication exchange between the avatar and the user, wherein the avatar utilizes the physical gestures in combination with speech to convey information during the communication exchange;
      identifying from the one or more responses an opportunity for the user to engage a tour guide system;
      establishing a communication session with the tour guide system and a language translation system;

generating an adapted avatar by adapting the characteristics of the avatar at least in part according to instructions supplied by the tour guide system and the physical gestures of the user, wherein selected characteristics of the avatar are retained in the adapted avatar based on behavior modeling of previous guided tours provided by the set-top box for the user;

identifying from the one or more responses a request for a tour of a location;

transmitting to the language translation system content in a language format other than a language understood by the user;

receiving from the language translation system a translation of the content in the language understood by the user; and causing the set-top box to present to the user mobile device the adapted avatar presenting the tour of the location and the translated content in the language understood by the user and utilizing the physical gestures of the user, wherein the tour of the location is presented via the adapted avatar based on location coordinates provided by the user mobile device.

2. The internet protocol television system of claim 1, wherein the controller circuit is operable to retrieve a user profile associated with the user mobile device in communication with the internet protocol television system, wherein the avatar has characteristics that correlate to the user profile, and wherein the content comprises at least one of content in an audio format or content in textual format, wherein the moving images are received from the set-top box and captured by a camera connected with the set-top box.

3. The internet protocol television system of claim 1, wherein the controller circuit is adapted to:
receive from the set-top box the content in the form of speech content from a party other than the user;
translate the speech content to the language understood by the user; and
cause the set-top box to present the adapted avatar presenting the translated speech content.

4. The internet protocol television system of claim 3, wherein the speech content of the party is one of live speech content of the party or pre-recorded speech content of the party, wherein the adapted avatar retains the selected characteristics based on behavior modeling of previous language translations for the user.

5. The internet protocol television system of claim 1, wherein the controller circuit is adapted to:
receive from the set-top box the content in the form of textual content generated by a source other than the user;
translate the textual content to the language understood by the user; and
cause the set-top box to present the adapted avatar presenting the translated textual content.

6. The internet protocol television system of claim 5, wherein the source corresponds to one of textual content of a website, or textual content of a book.

7. The internet protocol television system of claim 1, wherein the controller restores the characteristics of the avatar correlated to a user profile associated with the user in response to termination of the communication session with the tour guide system and the language translation system.

8. The internet protocol television system of claim 7, wherein the controller circuit is adapted to provide in addition to the tour a language translation of site descriptions of the location in a language other than the language of the user to the user's language.

9. The internet protocol television system of claim 7, wherein the controller circuit is adapted to share control of the presentation of the avatar with at least one of the language translation system or the tour guide system.

10. The internet protocol television system of claim 7, wherein the instructions supplied by the language translation system or the tour guide system correspond to artificial intelligence instructions.

11. The internet protocol television system of claim 7, wherein the controller circuit is adapted to record a fee directed to the user for services provided by at least one of the language translation system or the tour guide system.

12. The internet protocol television system of claim 2, wherein the controller circuit is adapted to retain a portion of the characteristics of the avatar correlated to the user profile while adapting the characteristics of the avatar to the instructions supplied by the language translation system.

13. The internet protocol television system of claim 2, wherein the controller circuit is adapted to:
detect a termination of the communication session with the language translation system; and
restore the characteristics of the avatar correlated to the user profile and terminate the adapted characteristics of the avatar generated from the instructions of the language translation system.

14. The internet protocol television system of claim 1, wherein the characteristics of the avatar correspond to clothing style, speech, maturity, and knowledge.

15. The internet protocol television system of claim 2, wherein the user profile comprises at least one of demographic profiling information of the user, psychographic profiling information of the user, or user preferences supplied by the user.

16. The internet protocol television system of claim 15, wherein the controller circuit is adapted to determine the demographic or psychographic profiling information of the user from at least one of a subscriber account of the user or a media consumption behavior of the user, wherein demographic profiling information of the user is based on at least one of age, gender, income, number of occupants in household, occupation, education, value of residential property, location of residential property, or fees paid for services rendered by the internet protocol television system, and wherein the psychographic profiling information is based on at least one of user traits, user attitudes, user interests, or user lifestyles determined from the consumption behavior.

17. A server, comprising:
a memory storing computer instructions; and
a controller circuit coupled with the memory, wherein the controller circuit responsive to executing the computer instructions performs operations comprising:
retrieving a user profile of a user mobile device;
obtaining moving images of a user of the user mobile device;
analyzing the moving images to detect physical gestures of the user, wherein the physical gestures of the user are traits of the user;
presenting an avatar having characteristics that correlate to the user profile and the moving images, wherein physical gestures of the avatar correlate with the physical gestures of the user;
detecting one or more responses of the user during a communication exchange between the avatar and the user;

establishing a communication session with a tour guide system responsive to identifying from the one or more responses an opportunity for the user to engage in a tour of a location; and presenting to the user mobile device an adaptation of the avatar that presents the tour of the location, wherein the avatar utilizes the physical gestures of the user in combination with speech to convey information associated with the tour of the location, wherein the tour of the location is presented via the adapted avatar based on location coordinates associated with the user mobile device, and wherein selected characteristics of the avatar are retained in the adapted avatar based on behavior modeling of previous guided tours via the avatar for the user.

18. The server of claim 17, wherein the controller circuit is adapted to update the characteristics of the avatar at least in part according to instructions supplied by a language translation system, wherein the adaptation of the avatar retains selected characteristics that are determined based on behavior modeling of previous language translations for the user.

19. The server of claim 17, wherein the avatar engine operates in a media communication system, and wherein the media communication system comprises an Internet Protocol Television communication system and an internet protocol multimedia subsystem network.

20. The server of claim 17, wherein the controller circuit is adapted to:
retain a portion of the characteristics of the avatar correlated to the user profile while adapting the characteristics of the avatar to the instructions supplied by a language translation system, wherein the retained portion of the characteristics is determined based on monitored behavior of the user;
detect a termination of the communication session with the language translation system; and
restore the characteristics of the avatar correlated to the user profile and terminate the characteristics of the avatar generated from the instructions of the language translation system.

21. The server of claim 18, wherein the characteristics of the avatar correspond to clothing style, speech, maturity, and knowledge, and wherein the user profile comprises demographic profiling information of the user, psychographic profiling information of the user, and user preferences supplied by the user.

22. A server, comprising:
a memory storing computer instructions; and
a controller circuit coupled with the memory, wherein the controller circuit responsive to executing the computer instructions performs operations comprising:
retrieving a user profile of a user mobile device;
obtaining moving images of a user of the user mobile device;
analyzing the moving images to detect physical gestures of the user, wherein the physical gestures of the user are traits of the user;
presenting an avatar having characteristics that correlate to the user profile and the moving images, wherein physical gestures of the avatar correlate with the physical gestures of the user;
detecting one or more responses of the user during a communication exchange between the avatar and the user;
identifying from the one or more responses a desire to tour a location;
establishing a communication session with a tour guide system;
adapting the characteristics of the avatar at least in part according to instructions supplied by the tour guide system; and
presenting to the user mobile device an adapted avatar presenting the tour of the location as the user mobile device moves through the location, wherein the adapted avatar utilizes the determined physical gestures of the user in combination with speech to convey information associated with the tour of the location.

23. The server of claim 22, wherein the controller circuit is adapted to:
detect one or more additional responses of the user;
identify from the one or more additional responses a desire to engage a language translation system to translate to a language understood by the user site information associated with the location toured by the avatar;
establish an additional communication session with the language translation system;
adapt the characteristics of the avatar at least in part according to instructions supplied by the language translation system;
transmit to the language translation system the site information;
receive from the language translation system a translation of the site information in the language understood by the user; and
present the adapted avatar presenting the translated site information in the language understood by the user.

24. The server of claim 22, wherein the controller circuit is adapted to:
monitor behavior of the user in previous communication exchanges with the avatar;
retain a portion of the characteristics of the avatar correlated to the user profile while adapting the characteristics of the avatar to the instructions supplied by the tour guide system, wherein the retained portion of the characteristics of the avatar are determined based on the monitored behavior of the user;
detect a termination of the communication session with the tour guide system; and
restore the characteristics of the avatar correlated to the user profile and terminate the characteristics of the avatar generated from the instructions of the tour guide system.

25. The server of claim 22, comprising a location receiver coupled to the controller circuit, wherein the controller circuit is adapted to:
detect from the one or more responses a need to navigate the user in the location;
engage the location receiver; and
present the user the adapted avatar presenting navigation instructions to the user in relation to the tour of the location.

* * * * *